United States Patent Office 2,801,915
Patented Aug. 6, 1957

2,801,915

REDUCTION OF METAL COMPOUNDS IN THE PRESENCE OF SULPHUR

Hendrik de Wet Erasmus, Lewiston Heights, N. Y., assignor to Union Carbide Corporation, a corporation of New York No Drawing. Application March 18, 1952, Serial No. 277,339

12 Claims. (Cl. 75—84.1)

The present invention relates to a method of reducing metallic compounds and, more particularly, to a method of reducing metallic oxides, sulphides and other metallic compounds of low volatility which in exothermic reaction with calcium do not give a sufficiently high percentage of molten metal and molten products, wherein the melting point of the metal is less than approximately 2000° C.

Many metallic compounds readily react with calcium to yield the reduced metal. Other metallic compounds are not easily reduced with calcium to give a massive metal regulus since sufficient heat cannot be imparted to the reactants and the reaction is itself not sufficiently exothermic. In the case of such metallic compounds, the reduction with calcium alone results in a finely-divided metallic product dispersed in the other reaction products. Such a metallic product is difficult and expensive to remove.

It is an object of the present invention to provide a process for the recovery of these latter metals from their sulphides, oxides and other metallic compounds of low volatility which in exothermic reaction with calcium do not produce a massive metal regulus.

Other aims and advantages of the invention will be apparent from the following description.

According to the present invention metallic oxides, sulphides and other metallic compounds (whose vapor pressure is preferably below atmospheric at temperatures below 400° C.) are reduced with calcium, in a bomb reaction, in the presence of sulphur. The reaction between sulphur and part of the calcium metal has been found sufficiently exothermic to generate the heat required to melt the metal and thereby produce a massive metal regulus. If the melting point of the reaction products is substantially higher than that of the metal, suitable fluxing agents, such as halides of calcium, may be added.

It has been found that the process of the present invention is applicable to the reduction of all metallic compounds, wherein the metal has a melting point lower than the reaction temperature of calcium and sulphur. Metals having melting points below about 2000° C. have generally been found to be amenable to production by the process of this invention. Excellent results have been obtained with those metals having melting points below about 1850° C.

In addition, it has been discovered that metallic compounds, which otherwise satisfy the conditions of the process of the present invention, but where the metals have a vapor pressure lower than that of calcium, are not amenable to the reduction process of the present invention.

The process of the invention may be successfully applied to the reduction of oxides and sulphides of titanium, zirconium, hafnium, chromium, columbium and thorium.

An essential feature of the process is to keep a stoichiometrically balanced proportion of the reactants in relatively uniform mixture during the occurrence of the rapid exothermic reaction. In general, the reaction is started by heating the vessel containing the reactants until at least the outer layers reach a temperature at which they begin to react. Localized heat may alternatively be applied electrically within the mass of mixed reactants, for example, by resistance heating of a filament of the metal being reduced embedded in the mixture of reactants. If the compound of the metal being reduced volatilizes or melts at temperatures far below the ignition temperature of the reaction, then excessive unmixing can occur to the detriment of the process. Therefore, in general, the process is preferably restricted to cases where the metal compound to be reduced does not melt or volatilize much below about 400° C.

In more detail, the metallic compound is reacted with metallic calcium and sulphur in a steel bomb in most cases lined with a refractory material such as lime, dolomite, or calcium sulphide. A calcium halide, or a suitable equivalent, is used as a fluxing agent. The bomb is ignited either by heating in a furnace or by electrically heating a strip of metal within the bomb. This metal should preferably be the same as that sought to be reduced.

The temperature within the bomb is modified by the reaction temperature of calcium and sulphur and can be increased to a greater or lesser extent depending on the amount of sulphur and calcium used. When the calcium and sulphur are present in the proper quantities at least some of the reduced metal obtained as a product of the reaction appears within the bomb as a regulus. Some of the metal may be trapped as globules on the side walls. Adherent reaction products can be removed from the metal by leaching, as for example leaching with water or hydrochloric acid.

In the case of some metals, for example titanium, it has been found that a metal of greater ductility can be produced if the oxygen content therein is held to a minimum. In these cases a more ductile metal can be produced when the metallic compound employed is a sulphide and a refractory lining of calcium sulphide is used, thereby excluding oxygen-bearing compounds from the system.

An example of an operation in accordance with the process of the present invention is as follows:

A 66.5 pound mixture containing 21.6% titanium dioxide, 57% calcium, 8.5% calcium chloride and 12.9% sulphur was reacted in a 10-inch diameter steel bomb having a 60 pound lining of fused dolomite. The furnace containing the bomb was heated to 920° C. to ignite the bomb. Fifteen minutes after the bomb was ignited the furnace was shut down, the bomb cooled, and the metal recovered. The total metal recovery was 7.55 pounds, 87.6% of the theoretical recovery, with 72.6% in ingot form and 15% in the form of sponge and side wall deposits.

In another example, a 28 pound mixture of 21.6% titanium dioxide, 57% calcium, 12.9% sulphur and 8.5% calcium chloride, was reacted in an 8-inch steel bomb having a 75 pound lining of fused dolomite. The furnace temperature was here raised to 1050° C. to ignite the bomb. The total metal recovery was found to be 3.63 pounds, 81.7% of the theoretical yield, of which 66.8% was in ingot form and 14.9% was in sponge and side wall deposits.

In a still further example, a 1598 gram mixture of 28.79% zirconium dioxide, 51.99% calcium, 11.38% sulphur, and 7.84% calcium chloride, was reacted in a 4-inch steel bomb having a fused dolomite lining. The furnace temperature was raised to 1080° C. to ignite the bomb. The total metal recovery was found to be 165.6 grams, 48.5% of the theoretical yield, of which 39.6% was in ingot form and 60.4% in the form of a spongy mass.

An example of an operation in accordance with the process of the present invention, wherein the bomb was provided with a refractory lining of calcium sulphide, is as follows:

A 1513 gram mixture, consisting of 37.64% titanium dioxide, 47.05% calcium, 9.91% calcium fluoride and 5.30% sulphur, was reacted in a 4-inch steel bomb having a lining of calcium sulphide. The furnace temperature was raised to 620° C. to ignite the bomb. The total metal recovery was found to be 90 grams, 37% of the theoretical yield. A comparison of the metal obtained when calcium sulphide lining was employed with the metal obtained when dolomite linings were used indicated conclusively that a less brittle metal is obtainable when calcium sulphide linings are employed.

What is claimed is:

1. A process for the recovery of metal by reducing a metallic compound selected from the group consisting of metal oxides and metal sulphides, where said metal is selected from the group consisting of titanium, zirconium, hafnium, columbium chromium and, thorium, comprising reacting said metallic compound in the presence of sulphur and in a closed reaction vessel with a quantity of calcium metal at least equal to the stoichiometric quantity required to react with said metallic compound and said sulphur.

2. A process for reducing a thorium compound selected from the group consisting of oxides and sulphides of thorium, comprising reacting said thorium compound in a closed reaction vessel with a quantity of calcium metal and a quantity of sulphur sufficient to react with a portion of said calcium metal to produce a reaction sufficiently exothermic to yield a thorium metal regulus, said quantity of calcium metal being sufficient to provide a portion to react with said sulphur and a remainder to react with substantially all of said thorium compound.

3. A process for reducing a metallic sulphide selected from the group consisting of titanium sulphide, zirconium sulphide, hafnium sulphide, columbium sulphide, chromium sulphide and thorium sulphide comprising reacting said metallic sulphide in a closed reaction vessel having a lining of calcium sulphide with a quantity of calcium metal and a quantity of sulphur sufficient to react with a portion of said calcium metal to produce an exothermic reaction, said quantity of calcium metal being sufficient to provide a portion to react with said sulphur and a remainder to react with substantially all of said metallic sulphide.

4. A process in accordance with claim 3 wherein said metallic sulphide is thorium sulphide.

5. A process in accordance with claim 3 wherein said metallic sulphide is zirconium sulphide.

6. A process in accordance with claim 3 wherein said metallic sulphide is chromium sulphide.

7. A process in accordance with claim 3 wherein said metallic sulphide is columbium sulphide.

8. A process in accordance with claim 3 wherein said metallic sulphide is titanium sulphide.

9. A process for reducing a titanium compound selected from the group consisting of oxides and sulphides of titanium, comprising reacting said titanium compound in a closed reaction vessel with a quantity of calcium metal and a quantity of sulphur sufficient to react with a portion of said calcium metal to produce a reaction sufficiently exothermic to yield a titanium metal regulus, said quantity of calcium metal being sufficient to provide a portion to react with said sulphur and a remainder to react with substantially all of said titanium compound.

10. A process for reducing a zirconium compound selected from the group consisting of oxides and sulphides of zirconium, comprising reacting said zirconium compound in a closed reaction vessel with a quantity of calcium metal and a quantity of sulphur sufficient to react with a portion of said calcium metal to produce a reaction sufficiently exothermic to yield a zirconium metal regulus, said quantity of calcium metal being sufficient to provide a portion to react with said sulphur and a remainder to react with substantially all of said zirconium compound.

11. A process for reducing a chromium compound selected from the group consisting of oxides and sulphides of chromium, comprising reacting said chromium compound in a closed reaction vessel with a quantity of calcium metal and a quantity of sulphur sufficient to react with a portion of said calcium metal to produce a reaction sufficiently exothermic to yield a chromium metal regulus, said quantity of calcium metal being sufficient to provide a portion to react with said sulphur and a remainder to react with substantially all of said chromium compound.

12. A process for reducing a columbium compound selected from the group consisting of oxides and sulphides of columbium, comprising reacting said columbium compound in a closed reaction vessel with a quantity of calcium metal and a quantity of sulphur sufficient to react with a portion of said calcium metal to produce a reaction sufficiently exothermic to yield a columbium metal regulus, said quantity of calcium metal being sufficient to provide a portion to react with said sulphur and a remainder to react with substantially all of said columbium compound.

References Cited in the file of this patent

UNITED STATES PATENTS

| | | |
|---|---|---|
| 802,256 | Bamberger et al. | Oct. 17, 1905 |
| 1,318,709 | Yautin | Oct. 14, 1919 |
| 1,321,684 | Turner et al. | Nov. 11, 1919 |
| 1,533,505 | Lubowsky | Apr. 14, 1925 |
| 1,593,660 | Lubowsky | July 27, 1926 |
| 1,648,954 | Marden | Nov. 15, 1927 |
| 1,704,257 | Marden et al. | Mar. 5, 1929 |
| 1,768,112 | Brennan | July 24, 1930 |
| 1,814,719 | Marden et al. | July 14, 1931 |
| 2,056,708 | Boecker | Oct. 6, 1936 |
| 2,203,214 | Doom | June 4, 1940 |
| 2,370,610 | Adeline | Feb. 27, 1945 |
| 2,421,029 | Magram | May 27, 1947 |
| 2,537,068 | Lilliendahl et al. | Jan. 9, 1951 |
| 2,561,526 | McKechnie et al. | July 24, 1951 |
| 2,700,606 | Wilhelm et al. | Jan. 25, 1955 |

FOREIGN PATENTS

| | | |
|---|---|---|
| 27,625 | Great Britain | of 1896 |
| 24,148 | Great Britain | of 1903 |